May 31, 1938.  M. ALNUTT  2,118,998
INTERIOR TRIM FOR AIRCRAFT
Filed Aug. 10, 1937
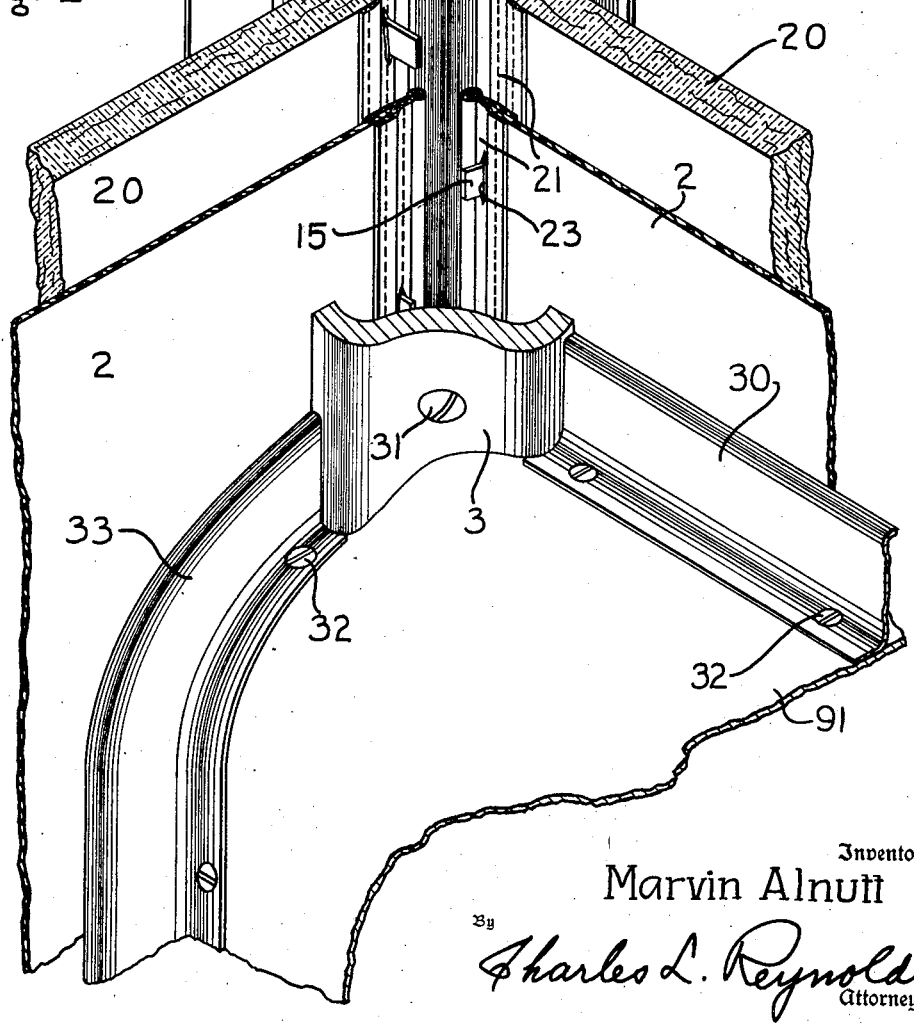
Inventor
Marvin Alnutt
By Charles L. Reynolds
Attorney Patented May 31, 1938

2,118,998

UNITED STATES PATENT OFFICE 2,118,998

INTERIOR TRIM FOR AIRCRAFT

Marvin Alnutt, Seattle, Wash., assignor to Boeing Aircraft Company, Seattle, Wash., a corporation of Washington Application August 10, 1937, Serial No. 158,316

10 Claims. (Cl. 72—115)

It is an appreciable problem to support within aircraft the wall covering panels which are employed, and which frequently incorporate or have beneath them insulating material. Such panels are of felted or fabric material or the like, and must be readily removable, so that when soiled they can be laundered or otherwise cleaned, and in additon they must be easily removable for inspection of structural parts covered thereby, or for access to parts within the space blocked off by such panels. At the same time the wall covering panels must be supported in such a way that they will not become accidentally disengaged from their supports.

Were these the only problems they could be solved with comparative simplicity by the employment of snap fasteners and the like, but such panels should be formed to size in order that interchangeable panels can be carried in stock or can be made up from patterns, yet being stretchable they cannot readily incorporate fixedly located securing means, for if they did, in the processes of laundering and cleaning, and in use, they would tend to shrink or stretch to a sufficient degree to render such fixedly positioned securing means unsuitable for the support of the panels. Moreover the supporting means must be light, and the aircraft structure, because minimum weight is an essential, cannot be formed rigidly to accommodate the various panels and compartments that may be desired in the interior finish of the airplane. Hence the basic support being light and flimsy, it offers but little resistance to pressure, and devices such as snap fasteners, which cannot be backed up solidly while being engaged, are for this reason not suitable to such uses.

It is an object of the present invention, then, to provide supporting means for such interior finish, particularly adapted to use in aircraft, which has the advantages indicated above as desirable, and which avoids the disadvantages set forth.

It is also an object to provide supporting means which is adaptable without change to different styles of wall covering panels, for instance panels with or without sound insulation material, or different styles of sound insulating material, and which is generally adapted or adaptable readily to all the places in an airplane where such finish must be used.

A further object is to provide such a support the principles of which can be applied in angles, about doorway and window framing and other apertures, which will adapt itself to inserted members such as ventilators and ashtrays, and about curves.

A still further object is to provide such a support which is simple and cheap to manufacture, and which is readily formed or bent to desired shapes, and readily installed.

With these and other objects in mind, as will appear hereafter, my invention comprises the novel supporting strip and the novel combination and arrangement thereof with the remaining elements of the wall covering panel and the aircraft structure, all as shown in the accompanying drawing, and as will be hereinafter more particularly described and defined.

In the accompanying drawing I have shown a typical installation incorporating my invention, it being understood that various changes will be made in it to adapt it to different locations and installations or uses, and that various changes may be made therein, still within the scope of my invention as hereinafter defined.

Figure 1 is a perspective view, with parts successively broken away, to illustrate a typical installation, in accordance with this invention, and Figure 2 is a typical cross section through the same.

The main aircraft structure is illustrated by the element 9, and this illustrates elements not necessarily especially located for the support of wall panels, but such as will be employed for other purposes and which may be employed in addition as the primary support for my supporting means. To this in turn may be secured an angle 90 formed of sheet metal, the use of which will be particularly desirable if the primary support 9 does not extend lengthwise of the edge of the panel and is not located directly at such a location. The member 90 may be omitted, however, if the supporting strip to be described can be secured directly to a structural member such as 9.

The supporting strip 1 is suitably formed to accommodate the conditions which it meets. When supporting the two wall covering panels which meet at the corner of a compartment, the supporting strip 1 is angled in shape, as shown, but when it is supported at the frame of a door, window, ventilator or the like it may lie all substantially in a single plane, parallel to the plane of the wall panel covering, but sufficiently beneath that plane to accommodate the thickness of sound insulation, etc., constituting part of the wall covering. In the angular form shown it has two flanges 11 and 12 disposed at the proper angle, and joined by a portion 13 in the interior of the angle which is preferably formed on a curve of large radius. It may also be provided with stiffening edge flanges 14. For its own support it is provided with holes at intervals to receive screws 10 threading into the members 9 or 90, or both.

For the immediate support of the wall covering panels studs 15 are struck up, as tongues, from the sheet metal of which the strip 1 is formed, for engagement in the edges of the panels. Preferably these studs are so struck up that the hole 16 from which they are struck lies at the interior side of the angle or away from the center of the panel which is to be supported on this stud, and the studs, lying in planes generally parallel to the edge of the panel or lengthwise of the strip 1, incline slightly outwardly and away from the center of the panels, or toward the interior of the angle, to the end that the tension of the panels, when the latter are stretched and engaged on the studs 15, will tend to pull to the bottom of the studs rather than off the studs, and this is the purpose also of striking them from holes 16 lying on the side away from the panels, for by so doing the tendency of the tension in the panels is to bend the studs farther, which tendency is more greatly resisted than a tendency to bend them back to their original position.

The wall covering panels, in the form herein shown, comprise panels of sound insulation, usually a thick, felted, fibrous mat, indicated at 20, and an interior or finish cover, preferably of fabric, as indicated at 2. The edges of these panels are preferably reinforced, as indicated at 21, the reinforcing material being, for example, a gimp of leather, artificial leather, or strong fabric, with a corded edge, as indicated at 22. These panels are made up of a size and shape to substantially cover the wall area, and to extend somewhat past the studs 15. In installing the panels they are held along the supporting strip 1, at one edge, and under sufficient tension lengthwise of the strip, whereupon their edges or the gimps 21 are slit with a knife at the locations of the individual studs, and the studs are passed through these slits. Now the panel is stretched to the opposite edge and these edges are slit in like manner and fitted upon the studs. Because the studs at opposite edges are inclined away from each other the tendency of the tension is to pull down to the base of the studs, or towards their hinge line, rather than outwardly and off the studs. The studs are preferably rectangular in shape rather than barbed or of a shape to more positively engage in the slits indicated at 23, for the reason that they are thus easily engaged, and when it is desired to remove the wall covering panels this is readily accomplished, yet because of the arrangement of the parts, as previously mentioned, there is little likelihood of accidental disengagement.

Accidental disengagement is further guarded against and the entire assembly is made neat in appearance by the employment of a cover strip 3. This cover strip may be of any suitable exterior shape or material, and overlies the edges of the wall covering panels 2 and the studs 15. It is provided with hole at intervals which may be matched with holes 17 provided in the curved portion 13 of the supporting strip 1, if the latter is angled, whereby screws 31 passing through the cover strip 3 are threaded into the holes 17, thereby supporting the cover strip, yet in a manner which permits its ready removal. The cover strip thus finishes the edge of the wall panel and prevents accidental disengagement of the edges of the wall covering panel from becoming disengaged from the studs 15.

A similar cover strip is indicated at 30 along another edge of the panel 2, which is secured in this instance by screws 32 received in a conduit cover 91, which may be considered as a structural part of the airplane. Again, the strip 33 is similar to the strip 30 and is secured by screws 32, but is curved to fit about a curve of the conduit cover 91. Beneath each of these cover strips 30 and 33 is a supporting strip corresponding to the strip 1, with the panels 2 and 20 similarly engaged therewith. The same principles may be adapted to the edge of the panels when they include or reach to a door frame, window frame, or the like.

Should the wall covering panels shrink or stretch somewhat after cleaning, new slits may be made at points which better match the locations of the studs 15, and the panel is still held properly and securely. Replacement panels can be made up from patterns, with the assurance that they will fit properly, since there are no definitely located fasteners incorporated in their edges, and the gimps can be made sufficiently wide to accommodate any reasonable variation in the overall dimensions of the panels.

What I claim as my invention is:

1. Means to support aircraft interior finish, comprising, in combination, a supporting strip adapted to be secured to the aircraft structure, and lying in a plane parallel to but slightly behind the plane of the finished wall, and having a plurality of outstanding studs, a flexible wall covering panel of a size to cover the wall area and to extend past said studs, and to be slit to receive said studs, and a cover strip securable to the supporting strip, overlying the studs to prevent disengagement of the panel from the latter without removal of the cover strip.

2. Means to support aircraft interior finish, comprising, in combination, an angled supporting strip adapted for securement to the aircraft structure, with its flanges disposed at the junction of two wall areas, but slightly beneath the planes of the finished walls, a plurality of studs outstanding from the flanges of said strip, flexible wall covering panels of a size to cover the wall area and to extend past said studs, and to be slit to receive said studs, and a cover strip securable to the supporting strip, overlying the studs to prevent disengagement of the panels from the studs without removal of the cover strip.

3. Means to support aircraft interior finish, comprising, in combination, a supporting strip of sheet metal adapted for securement to the aircraft structure, studs struck up from said strip, a flexible wall covering panel of a size and shape to cover the wall area and to extend past said studs, and to be slit to receive said studs, the latter inclining outwardly and away from the center of the panel, to minimize the likelihood of the panel pulling off, when stretched, and a cover strip securable to the supporting strip, overlying the studs to prevent disengagement of the panel from the latter without removal of the cover strip.

4. Means to support aircraft interior finish, comprising, in combination, a supporting strip of sheet metal adapted for securement to the aircraft structure, studs struck up from said strip, inclining outwardly and away from the center of a wall panel to be secured thereon, and each stud having its plane parallel to the edge of such panel, a flexible wall panel, having a reinforced edge, and of a size and shape to cover the wall area and to extend past the studs, to bring its reinforced edge in the line of the studs, to be slit for the reception of such studs, and a cover strip removably securable to the supporting strip, overlying the studs and the reinforced edge of the panel, to prevent disengagement of the studs from the slits in the panel without removal of the cover strip.

5. Means to support aircraft interior finish, comprising, in combination, an angled sheet metal supporting strip having two flanges joined by a curved portion, and having apertures in at least one flange for reception of screws to secure it to the aircraft structure, studs struck up from both flanges, flexible wall covering panels of a size and shape to cover the wall area and to extend past said studs, and to be slit to receive said studs, a cover strip of a size and shape to overlie the studs, and screws passing through the cover strip and threaded into the curved angle of the supporting strip, to secure the former removably in place.

6. Means to support a flexible wall covering panel, in an aircraft, comprising a sheet metal strip, having means to secure it to the aircraft structure, and a flange lying parallel to but slightly beneath the plane of the wall panel, and substantially rectangular studs struck up along said flange, from the metal thereof, along a hinge line parallel to the edge of the panel, said studs projecting generally at right angles to the panel, but inclined slightly away from the panel.

7. Means to support a flexible wall covering panel, in an aircraft, comprising a sheet metal strip, having means to secure it to the aircraft structure, and a flange lying parallel to but slightly beneath the plane of the wall panel, and a plurality of substantially rectangular studs struck up from the metal of said flange, projecting outwardly generally at right angles to the flange, to leave the hole on the side away from the panel to be supported, but inclined slightly away from such panel, and disposed in planes extending lengthwise of the strip.

8. Means to support a flexible wall covering panel, in an aircraft, comprising a sheet metal strip formed with two angled flanges connected by a curved portion, holes along each flange for the reception of screws to support the strip from the aircraft structure, and a plurality of substantially rectangular studs struck up from the metal of each flange, to leave the holes adjacent the interior of the angle, the studs lying in planes extending lengthwise of the strip, and inclined slightly towards the interior of the angle, and the curved connecting portion having holes threaded for the reception of screws to support a cover strip.

9. Means to support aircraft wall panels of stretchable fabric or the like, comprising supporting strips fixed to the aircraft structure at locations corresponding to the edges of such panels, and resilient studs spaced at intervals along the supporting strips, and projecting generally at right angles to the plane of the panels, but inclined slightly away from the center of the panels, the resilience of the studs operating to stretch the fabric between studs at its opposite edges.

10. Means to support aircraft wall panels of fabric or the like, comprising supporting strips fixed to the aircraft structure at locations corresponding to the edges of such panels, resilient studs spaced at intervals along the supporting strips, and inclined slightly away from the center of the panels, and gimps secured along the edges of the panels, of a width to accommodate variations in the width of the panels, and adapted to be slit, to receive the studs in such slits.

MARVIN ALNUTT.